Jan. 22, 1963 W. A. THORNTON, JR 3,075,118
ELECTROLUMINESCENT PHOSPHOR, METHOD OF IMPROVING
ELECTROLUMINESCENT PHOSPHOR AND
ELECTROLUMINESCENT LAMP
Filed Dec. 9, 1960

INVENTOR.
WILLIAM A. THORNTON, Jr.
BY
W. D. Palmer
ATTORNEY.

United States Patent Office 3,075,118
Patented Jan. 22, 1963

3,075,118
ELECTROLUMINESCENT PHOSPHOR, METHOD OF IMPROVING ELECTROLUMINESCENT PHOSPHOR AND ELECTROLUMINESCENT LAMP
William A. Thornton, Jr., Cranford, N.J., assignor to Westinghouse Electric Corporation, East Pittsburgh, Pa., a corporation of Pennsylvania
Filed Dec. 9, 1960, Ser. No. 74,805
6 Claims. (Cl. 313—108)

This invention relates to a method for improving electroluminescent phosphor and, more particularly, to a method for improving the maintenance of light emission of electroluminescent phosphor, the resulting improved phosphor and an electroluminescent lamp which incorporates such improved phosphor.

The phenomenon of electroluminescence was first disclosed by G. Destriau, one of his earlier publications appearing in London, Edinburgh and Dublin Philosophical Magazine, series 7, volume 38, No. 285, pages 700–737 (October 1947). Since this early publication, electroluminescent devices have been marketed commercially. As in the case of any light source, the light output of electroluminescent lamps decreases throughout rated life. It is desirable to maintain the rate of decrease of the light emission of electroluminescent lamps at as low a value as possible, since this determines rated life. A light source in which the light output decreases at a relatively slow rate is said to have "good maintenance of light output" or simply "good maintenance."

Electroluminescent lamps are particularly sensitive to damage by moisture, as normally encountered when such lamps are operated under conditions of high humidity. Because of this sensitivity, elaborate precautions have been taken to protect such lamps against damage by moisture. These precautions are not always as effective as desired, however, with resulting damage to the lamps.

It is the general object of this invention to provide a method for making electroluminescent phosphor in order to improve its maintenance of light output.

It is another object to provide an electroluminescent phosphor having improved maintenance of light output.

It is still another object to provide method details for making electroluminescent phosphor having improved maintenance of light output.

It is a further object to provide an electroluminescent lamp having improved maintenance, which lamp incorporates electroluminescent phosphor that has been specially prepared.

It is an additional object to provide a method for making electroluminescent phosphor which is relatively insensitive to damage by moisture.

The aforesaid objects of the invention, and other objects which will become apparent as the description proceeds, are achieved by including in the phosphor raw mix relatively large amounts of so-called activator and coactivator materials. The lamp incorporating the resulting phosphor will display an excellent maintenance of light output.

For a better understanding of the invention, reference should be had to the accompanying drawings wherein.

Figure 1:
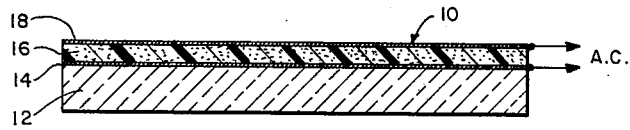
FIG. 1 is a sectional-elevational view of an electroluminescent lamp incorporating phosphor prepared in accordance with the present invention.

With specific reference to the form of the invention illustrated in the drawings, in FIG. 1 is shown an electroluminescent lamp 10 which generally comprises a glass foundation 12 having coated thereon a first electrode 14 which is formed of light-transmitting, electrically conducting tin oxide. Coated over the electrode 14 is a layer 16 comprising electroluminescent phosphor which has been initially processed in accordance with the present invention. Over the layer 16 is a second electrode 18 which is formed of vacuum-metallized aluminum or light-transmitting copper iodide, for example. An alternating potential is adapted to be applied between the electrodes 14 and 18 to energize the electroluminescent device to light emission.

The tin oxide electrode 14 can be formed of other suitable light-transmitting, electrically conducting material such as indium or titanium oxides or copper iodide. In this specific example, the phosphor, which has been initially processes as explained thereinafter, is mixed with equal parts by weight of a light-transmitting dielectric such as polyvinylchloride acetate and the thickness of the layer 16 is approximately 2 mils. The thickness of the layer 16 is not critical and can be varied considerably as can the relative proportions of phosphor and mixed dielectric. If desired, a separate layer of dielectric can be included between the lamp electrodes 14 and 18 or the dielectric can be dispensed with entirely and powdered phosphor compacted between these two electrodes of the lamp without any mixed dielectric. Either or both of the electrodes 14 or 18 can be replaced by a mesh of wires or the electrodes for the lamp 10 can be formed as an interlacing mesh of wires with phosphor therebetween.

The phosphor of the present invention is zinc sulfide electroluminescent phosphor which includes copper activator. Other activators can be used to supplement the copper activator, an example being a manganese activator. As in the case of the usual electroluminescent phosphor, a halogen or mixture of halogens, in compound form, is required in the phosphor raw mix to enable the primary copper activator to be assimilated into the zinc sulfide matrix to render the material electroluminescent. In accordance with the present invention, the copper activator and halogen coactivator are included in compound form in the phosphor raw mix in relatively large percentages with respect to the zinc sulfide matrix material. After firing and other processing, the resulting phosphor will display an excellent maintenance of light output.

Figure 2:
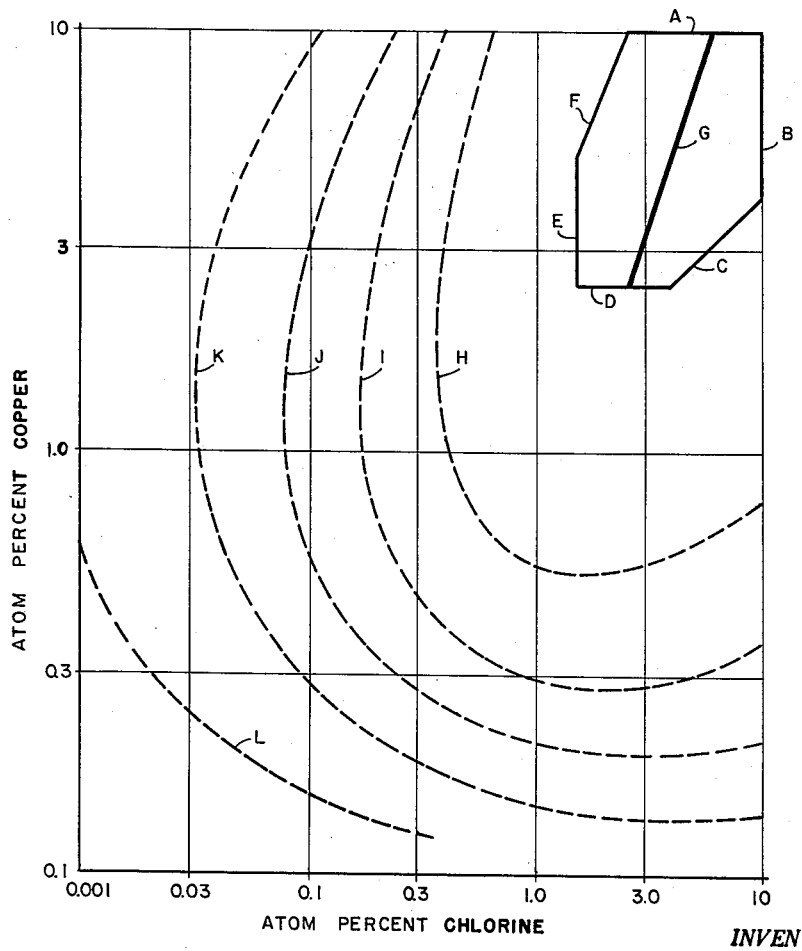
FIG. 2 is a graph of atom percent copper activator versus atom percent chlorine coactivator in the phosphor raw mix, with the relative proportions of activator and coactivator required for improved maintenance shown as an enclosed area.

More specifically, finely divided zinc sulfide, copper in compound form and chloride, bromide or iodide, or mixtures thereof, are thoroughly mixed in such proportions that a plot of atom percent of total copper per molecule of zinc sulfide in the unfired mix versus atom percent of total halogen per molecule of zinc sulfide in the unfired mix falls within the area enclosed by the lines A through F, as shown in FIG. 2. If the phosphor raw mix falls within the area enclosed by these lines on the plot, a device incorporating the prepared phosphor will have an electroluminescent maintenance of light emission which is much greater than that which is normally obtained. Each of the lines A through F in FIG. 2 can be represented by formula as follows: (line A)—atom percent of copper=10; (line B)—atom percent of halogen=10; (line C)—atom percent of copper=1.27 (atom percent of halogen)$^{0.5}$; (line D)—atom percent of copper=2.5; (line E)—atom percent of halogen=1.5; (line F)—atom percent of copper=3.0 (atom percent halogen)$^{1.3}$. Preferably the relative atom proportions of copper and halogen are so selected as to fall about on the line G and within the enclosed area as shown in FIG. 2. Line G can be represented by formula as follows: atom percent copper=0.45 (atom percent halogen)$^{1.7}$, with the atom percent copper being from 2.5 to 10.

As a specific example, 10 grams of finely divided zinc sulfide are wet mixed with 1.0 gram of copper acetate and 0.25 gram of ammonium chloride. This will provide both copper and chlorine in the raw mix in amount of about 5 gram-atom percent per gram mole of zinc sulfide. To the raw mix is added about 0.3 gram of elemental sulphur in order to provide a sulphurizing atmosphere. The amount of added sulphur can be varied considerably. The wet raw mix is dried and the dry powder placed in a covered silica tube having the capacity of about 12 cc. The silica tube should permit egress of any positive pressures generated therein during firing. The raw mix is then fired in an inert atmosphere such as nitrogen at a temperature of about 950° C. for about 1 hour. This firing renders the phosphor electroluminescent, although it has a dark grey appearance and is in the form of a friable cake. The dark, fired phosphor cake desirably is crushed to finely divided status, such as with a mortar and pestle. Some conditions of firing will produce a very soft phosphor which will not require any appreciable reduction to finely divided status. As an example, the finely divided phosphor has an average particle diameter of about twelve microns and this is subject to considerable variation. Preferably, the foregoing firing is repeated, in order to insure complete reaction of the raw-mix constituents. The fired, finely divided phosphor is then washed in a solution of sodium cyanide, which desirably is made alkaline with sodium hydroxide in order to prevent any evolution of hydrogen cyanide gas. As an example, the phosphor is washed for about ten minutes in a 10% by weight aqueous solution of sodium cyanide which also contains 5% by weight of sodium hydroxide. Thereafter the washed phosphor desirably is rinsed several times with distilled water, separated from the watere rinse, and to facilitate drying desirably is heated to about 120° C. The foregoing washing removes excess cuprous sulfide from the surface of the phosphor and the body color of the washed, finely divided phosphor is generally white.

If the relative proportions of copper activator and halogen coactivator in the raw mix fall within the plot described by the lines A through F as shown in FIG. 2, the maintenance of the resulting phosphor will be considerably improved. In testing the present phosphors, they were incorporated into electroluminescent lamps fabricated generally as shown in FIG. 1. Other generally similar lamps were fabricated using different phosphors in which the activator and coactivator proportions were varied. All of these lamps were then operated under high frequency excitataion in order to accentuate deterioration of light output. After an equal, extended period of operation under such excitation, the electroluminescent lamps incorporating phosphor prepared in accordance with the present invention displayed a light output which was from 18% to 22% of initial light output. Lamps incorporating phosphors prepared with relative proportions of copper and chlorine as indicated by the dashed line or maintenance contour designated H displayed, under similar operating conditions, a maintenance of only 10% of initial light output. The maintenance characteristics of lamps incorporating other phosphors are indicated by the dashed maintenance contours as follows: line I represents the 5% maintenance contour, line J represents the 3% maintenance contour, line K represents the 2% maintenance contour and line L represents the 1% maintenance contour.

With respect to the plot enclosed by the lines A through F as shown in FIG. 2, the relative proportions of copper and chlorine should not exceed 10% per molecule of zinc sulfide in the raw mix or brightness will suffer considerably. If the relative proportion of halogen coactivator is less than 1.5 gram atom percent or if the relative proportion of copper activator is less than 2.5%, the maintenance will not be as good. The lines C through F generally describe a contour of equal maintenance.

If chlorine or bromine is used as the coactivating material, the color of the phosphors prepared in accordance with the present invention will vary from green to yellow: If iodine coactivator is used in the same indicated relative proportions as the chlorine, the phosphor electroluminescent emission color will be generally blue, with the maintenance generally equivalent to that obtained with the chlorine coactivator. This is particularly interesting, since zinc sulfide phosphors activated with copper and coactivated with chlorine and tailored to have a blue emission will normally have a relatively poor maintenance of light emission.

As indicated hereinbefore, other additional activators can be used to supplement the copper activator. As an example, up to ten gram atom percent of manganese in compound form can be added to any of the foregoing phosphors. It is preferred to limit the manganese addition to from about one gram atom percent to four gram atom percent, taken with respect to each gram mole of zinc sulfide in the phosphor raw mix. Of course, less than one percent and more than four percent of manganese can be used. As a specific example, the phosphor raw mix can comprise zinc sulfide, five gram-atom percent of copper added as acetate, five gram-atom percent of chlorine, iodine or bromine or mixtures thereof added as the ammonium halide and four gram-atom percent of manganese added as the carbonate. Such a phosphor will have a yellowish electroluminescent response and an excellent maintenance of light output.

It has been found that the total number of cycles of excitation alternating potential to which the phosphor of an electroluminescent lamp is subjected constitutes a primary factor in causing the deterioration or decrease in light output of the lamp. In other words, a lamp which is operated at 60 c.p.s. will deteriorate in light output at $\frac{1}{60}$ of the deterioration rate of a similar lamp which is operated with an excitation potential of the same magnitude, but with a frequency of 3600 c.p.s. In addition, a representative rated lifetime for an electroluminescent lamp is conveniently meaesured by the total number of cycles of operation which are required to reduce the light output of the lamp to one-half of its initial value. Lamps incorporating phosphor prepared in accordance with the present invention have been operated under high-frequency excitation until the light output has decreased to one-half of the initial value. Had these same lamps been operated with an excitation potential of equivalent magnitude, but which had a frequency of only 60 c.p.s., the rated life, that is, the period required to decrease the light output to one-half its initial value, would have been in excess of five years. Even longer potential lifetimes can be obtained through additional, supplemental processing techniques.

Zinc sulfide phosphor prepared in accordance with the present invention is quite insensitive to damage by moisture. Even when such phosphors are incorporated into lamps and operated in damp air with no protection, the resulting maintenance of light emission is still reasonably good. When operated under conditions of high humidity without special protection, a typical electroluminescent lamp will last something in the order of $8 \times 10^7$ cycles before the light output decreases to one-half its initial value. Lamps incorporating the present phosphors, in contrast, have been operated under conditions of high humidity, without special protection, for almost $1 \times 10^{10}$ cycles before the light output has dropped to one-half the initial value. If special constructions are used to protect the lamps from the deleterious effects of moisture, the rated life of the lamps can be improved still more.

The foregoing specific example for preparing the present phosphor can be modified considerably. To illustrate, the specific firing conditions which have been set forth are subject to variation. In this regard, the firing temperature can be varied from 850° C. to 1000° C. and even this range can be extended. The firing time can also be varied, with the higher the firing temperature, the shorter the firing time. The sulphurizing atmosphere which is obtained through the addition of elemental sulphur to the raw mix can be obtained with a controlled mixture of nitrogen, hydrogen sulfide and hydrogen chloride. The washing solution which is used to remove excess cuprous sulfide is preferably the aqueous sodium cyanide solution as described, although other solvents which function in a similar manner can be substituted for this preferred washing solution.

In the foregoing specific example, copper has been added in compound form as the acetate and chlorine as ammonium chloride. The copper can be added in the form of other compounds, such as copper nitrate, sulfite or sulfate, for example. The chlorine can be added in other forms such as zinc chloride or cadmium chloride for example. It the case of the latter addition, the cadmium will not volatilize in firing, but the amount of cadmium present is too small to affect appreciably the properties of the phosphor. Other copper- and halogen-containing compounds can be substituted for those indicated, excluding those compounds which include the well-known phosphor poisoning metals, namely, iron, cobalt, nickel or chromium, an example being copper chromate. In addition, some zinc oxide can be tolerated in the phosphor raw mix.

While the maintenance of the present phosphor is excellent, it can be further improved by supplemental processing technique. In one such technique, the larger diameter phosphor particles can be segregated for incorporation into a lamp. The maintenance can also be further improved by baking the phosphor in air after initial preparation, as disclosed in copending application S.N. 58,979, filed September 28, 1960, and owned by the present assignee.

Variations in preparation techniques for the present phosphor, such as variations in firing temperature, firing time, batch size, etc. may modify slightly the relative proportions of the raw mix constituents which are required in order to achieve the best improvements in maintenance of light output. Such required variations in the relative proportions of activator, coactivator and zinc sulfide matrix in the raw mix constituents are readily determinable. In all cases, the relative proportions of the phosphor raw mix constituents should be so adjusted as to provide, in the finished phosphor, the same relative proportions of activator, coactivator and zinc sulfide matrix as are obtained when firing the phosphor raw mix, as specified hereinbefore, under the specific firing conditions which have been carried through in detail.

It will be recognized that the objects of the invention have been achieved by providing a method for improving the maintenance of copper-activated zinc sulfide electroluminescent phosphor and there have also been provided the resulting phosphor as well as an electroluminescent lamp having improved maintenance. In addition, such a lamp will display excellent maintenance characteristics under conditions of high humidity, without taking special precautions to protect the lamp from moisture.

While best examples of the invention have been illustrated and described in detail, it is to be particularly understood that the invention is not limited thereto or thereby.

I claim:

1. The method of preparing zinc sulfide electroluminescent phosphor which includes copper as activator in order to obtain a high degree of electroluminescent maintenance of light emission from an electroluminescent device incorporating such prepared phosphor, which method comprises: mixing zinc sulfide with copper in compound form and at least one of the first group consisting of chlorine, bromine and iodine in compound form, and excluding compounds containing at least one of the group consisting of iron, cobalt, nickel and chromium, with the mixed ingredients having such relative proportions that a plot of atom percent of copper per molecule of zinc sulfide in such mixture vs. atom percent of total halogen of said first group per molecule of zinc sulfide in such mixture falls within the area described and enclosed by the following lines on such plot:

atom percent of copper=1.27 (atom percent of said first group)$^{0.5}$,
atom percent of copper=3.0 (atom percent of said first group)$^{1.3}$,
atom percent of said first group=1.5,
atom percent of said first group=10,
atom percent of copper=2.5,
atom percent of copper=10;

firing the mixture at a predetermined temperature and for a predetermined time in a sulphrizing atmosphere to convert the mixture into an electroluminescent phosphor; and washing the fired phosphor in a material which is a good solvent for cuprous sulfide but which is not a good solvent for zinc sulfide.

2. The method of making an electroluminescent phosphor as specified in claim 1, wherein the halogen in said first group consists of chlorine.

3. The method of making an electroluminescent phosphor as specified in claim 1, wherein additional manganese in compound form is included with said mixed zinc sulfide, halide and copper compound, and wherein said maganese in compound form is included in amount of from one atom percent to ten atom persent per molecule of mixed zinc sulfide.

4. The method of preparing zinc sulfide electroluminescent phosphor which includes copper as activator in order to obtain a high degree of electroluminescent maintenance of light emission from an electroluminescent device incorporating such prepared phosphor which method comprises: mixing zinc sulfide with copper in compound form and at least one of the first group consisting of chlorine, bromine and iodine in compound form, and excluding compounds containing at least one of the group consisting of iron, cobalt, nickel and chromium, with the mixed ingredients having such relative proportions that a plot of atom percent of copper per molecule of zinc sulfide in such mixture vs. atom percent of total halogen of said first group per molecule of zinc sulfide in such mixture falls on about the following line on such plot: atom percent of copper=0.45 (atom percent of said first group)$^{1.7}$, with atom percent of copper being from 2.5 to 10; firing the mixture at a predetermined temperature and for a predetermined time in a sulphurizing atmosphere to convert the mixture into an electroluminescent phosphor; reducing the fired phosphor to finely divided status; and washing the finely divided phosphor in a material which is a good solvent for cuprous sulfide but which is not a good solvent for zinc sulfide.

5. A zinc sulfide electroluminescent phosphor which has a high degree of electroluminescent maintenance of light emission when incorporated into an electroluminescent device, said phosphor including copper in activator proportions and coactivator of at least one of the group consisting of chlorine, bromine and iodine, said activator and coactivator being present in amounts equivalent to those obtained when the phosphor is prepared as follows: mixing zinc sulfide with copper in compound form and at least one of the first group consisting of chlorine, bromine and iodine in compound form, and excluding compounds containing at least one of the group consisting of iron, cobalt, nickel and chromium, with the mixed ingredients having such relative proportions that a plot of atom percent of copper per molecule of zinc sulfide versus atom percent of total halogen of said first group per molecule of zinc sulfide in such mixture falls within the area described and enclosed by the following lines on such plot:

atom percent of copper=1.27 (atom percent of said first group)$^{0.5}$,
atom percent of copper=3.0 (atom percent of said first group)$^{1.3}$,
atom percent of said first group=1.5,
atom percent of said first group=10,
atom percent of copper=2.5,
atom percent of copper=10;

firing about 10 grams of said mixture together with a small amount of sulphur at a temperature of about 950° C. for about one hour in a covered silica tube containing a nitrogen atmosphere and having a capacity of about 12 cc. and which covered silica tube will permit egress of any positive pressures generated therein during such firing; reducing the fired phosphor to finely divided status; and washing the finely divided phosphor in a material which is a good solvent for cuprous sulfide but which is not a good solvent for zinc sulfide in order to impart thereto a generally white body color.

6. An electroluminescent lamp comprising: spaced electrodes, material between said spaced electrodes comprising zinc sulfide electroluminescent phosphor, said phosphor having been prepared by the method which comprises: mixing zinc sulfide with copper in compound form and at least one of the first group consisting of chlorine, bromine and iodine in compound form, and excluding compounds containing at least one of the group consisting of iron, cobalt, nickel and chromium, with the mixed ingredients having such relative proportions that a plot of atom percent of copper per molecule of zinc sulfide in such mixture vs. atom percent of total halogen of said first group per molecule of zinc sulfide in such mixture falls within the area described and enclosed by the following lines on such plot:

atom percent of copper=1.27 (atom percent of said first group)$^{0.5}$,
atom percent of copper=3.0 (atom percent of said first group)$^{1.3}$,
atom percent of said first group=1.5,
atom percent of said first group=10,
atom percent of copper=2.5,
atom percent of copper=10;

firing the mixture at a predetermined temperature and for a predetermined time in a sulphurizing atmosphere to convert the mixture into an electroluminescent phosphor; reducing the fired phosphor to finely divided status; and washing the finely divided phosphor in a material which is a good solvent for cuprous sulfide but which is not a good solvent for zinc sulfide.

References Cited in the file of this patent
UNITED STATES PATENTS

| | | |
|---|---|---|
| 2,874,128 | Wachtel | Feb. 17, 1959 |
| 2,911,553 | Joorman et al. | Nov. 3, 1959 |
| 2,950,257 | Froelich | Aug. 23, 1960 |
| 2,965,580 | Umberger | Dec. 20, 1960 |